(12) United States Patent
Immonen et al.

(10) Patent No.: US 7,885,637 B2
(45) Date of Patent: Feb. 8, 2011

(54) BILLING IN MOBILE COMMUNICATIONS SYSTEM EMPLOYING WIRELESS APPLICATION PROTOCOL

(76) Inventors: Marko Immonen, Purjebtijantie 6 A 6, Oulu (FI) FIN-90560; Ari Juntunen, Sihtikuja 1D 51, Oulu (FI) FIN-90520; Kimmo Keinänen, Talvikktie 18 A 3, Oulu (FI) FIN-90580; Tero Huostila, Pursimiehenkatu 25 A 7, Helsinki (FI) FIN-00150

(*) Notice: Subject to any disclaimer, the term of this patent is extended or adjusted under 35 U.S.C. 154(b) by 0 days.

(21) Appl. No.: 11/511,742

(22) Filed: Aug. 28, 2006

(65) Prior Publication Data

US 2007/0060102 A1    Mar. 15, 2007

Related U.S. Application Data

(63) Continuation of application No. 10/243,366, filed on Sep. 12, 2002.

(30) Foreign Application Priority Data

Mar. 14, 2000 (FI) .................................. 20000589
May 24, 2000 (FI) .................................. 20001249
Mar. 13, 2001 (FI) ...................... PCT/FI01/00243

(51) Int. Cl.
*H04M 11/00* (2006.01)

(52) U.S. Cl. ...................... 455/406; 455/405; 455/408; 705/26; 705/34; 705/40

(58) Field of Classification Search ......... 455/405–408, 455/414.1, 456.3, 414.2, 414.3, 418–420; 705/1, 34, 40; 709/206, 226, 203, 217–219, 709/223–224; 379/114.03, 114.28; 725/1–8
See application file for complete search history.

(56) References Cited

U.S. PATENT DOCUMENTS 5,715,314 A    2/1998 Payne et al.

(Continued)

FOREIGN PATENT DOCUMENTS

EP    0817452 A2    1/1998

(Continued)

OTHER PUBLICATIONS

Non-Final Office Action Issued for U.S. Appl. No. 10/243,366, filed Sep. 12, 2002, Mailed on Aug. 18, 2009, 30 pages.

(Continued)

*Primary Examiner*—Anthony S. Addy
(74) *Attorney, Agent, or Firm*—Foley & Lardner LLP (57) ABSTRACT

The invention relates to a network part and a method for generating billing data in a mobile communications system employing a wireless application protocol. The network part of the mobile communications system comprises: means for setting up a bi-directional wireless data transmission connection to a subscriber terminal; means for transmitting a service request sent by the subscriber terminal to a contents server providing the service; means for transmitting response data generated in the contents server on the basis of the service request to the subscriber terminal; identifying means for identifying transactions associated with the service from among the service requests and the response data on the basis of the identification of the Internet address of the service referred to in the service request and the response data; and billing means for generating billing data for the service using the transactions identified on the basis of the service's Internet address.

26 Claims, 4 Drawing Sheets

U.S. PATENT DOCUMENTS

| | | | |
|---|---|---|---|
| 5,812,776 A | 9/1998 | Gifford | |
| 5,943,320 A | 8/1999 | Weik et al. | |
| 5,963,915 A * | 10/1999 | Kirsch | 705/26 |
| 5,968,127 A * | 10/1999 | Kawabe et al. | 709/226 |
| 5,978,775 A | 11/1999 | Chen | |
| 6,055,236 A | 4/2000 | Nessert et al. | |
| 6,154,738 A * | 11/2000 | Call | 707/4 |
| 6,212,565 B1 | 4/2001 | Gupta | |
| 6,269,361 B1 | 7/2001 | Davis et al. | |
| 6,374,359 B1 | 4/2002 | Shrader et al. | |
| 6,487,401 B2 | 11/2002 | Suryanarayana et al. | |
| 6,594,692 B1 * | 7/2003 | Reisman | 709/219 |
| 6,732,150 B1 * | 5/2004 | Thrane | 709/206 |
| 6,742,022 B1 * | 5/2004 | King et al. | 709/219 |
| 6,785,716 B1 | 8/2004 | Nobakht | |
| 6,792,265 B1 | 9/2004 | Chan et al. | |
| 6,801,906 B1 | 10/2004 | Bates et al. | |
| 6,822,954 B2 | 11/2004 | McConnell et al. | |
| 6,839,684 B1 * | 1/2005 | Rissanen et al. | 705/34 |
| 6,938,171 B1 | 8/2005 | Isomichi et al. | |
| 7,020,479 B2 | 3/2006 | Martschitsch | |
| 7,162,436 B1 | 1/2007 | Eckel, Jr. | |
| 7,222,088 B2 * | 5/2007 | Nishikado et al. | 705/26 |
| 7,222,293 B1 * | 5/2007 | Zapiec et al. | 715/205 |
| 7,324,972 B1 | 1/2008 | Oliver et al. | |
| 7,328,000 B2 | 2/2008 | Juntunen et al. | |
| 2002/0029197 A1 * | 3/2002 | Kailamaki et al. | 705/40 |
| 2002/0052754 A1 | 5/2002 | Joyce et al. | |
| 2002/0083178 A1 | 6/2002 | Brothers | |
| 2002/0134830 A1 * | 9/2002 | Golub et al. | 235/375 |
| 2002/0155848 A1 | 10/2002 | Suryanarayana | |
| 2002/0163938 A1 | 11/2002 | Tuomainen et al. | |
| 2003/0073426 A1 | 4/2003 | Chan et al. | |
| 2003/0074286 A1 | 4/2003 | Rodrigo | |
| 2004/0002324 A1 | 1/2004 | Juntunen et al. | |
| 2004/0103192 A1 | 5/2004 | Yli-Korhonen et al. | |
| 2004/0249935 A1 | 12/2004 | Jackson et al. | |
| 2007/0060102 A1 | 3/2007 | Immonen et al. | |

FOREIGN PATENT DOCUMENTS

| | | |
|---|---|---|
| GB | 2 332 337 | 6/1999 |
| JP | 10-117215 | 10/1998 |
| WO | WO 99/21350 | 4/1999 |
| WO | WO-99/29065 | 6/1999 |
| WO | WO-99/33034 | 7/1999 |
| WO | WO-99/45684 | 9/1999 |
| WO | WO-00/46963 | 8/2000 |

OTHER PUBLICATIONS

Final Office Action and references cited issued Mar. 19, 2010 in U.S. Appl. No. 10/243,366, filed Sep. 12, 2002, 21 pgs.

* cited by examiner

BILLING IN MOBILE COMMUNICATIONS SYSTEM EMPLOYING WIRELESS APPLICATION PROTOCOL

CROSS-REFERENCE TO RELATED APPLICATIONS

This application is a continuation of U.S. patent application Ser. No. 10/243,366 filed Sep. 12, 2002, which is the National Stage Application of International Application No. PCT/FI01/00243 filed Mar. 13, 2001, which claims priority to both Finland Patent Application No. 20001249 filed May 24, 2000 and Finland Patent Application No. 20000589 filed Mar. 14, 2000. Both the '366 and the '243 patent applications identified immediately above are incorporated herein by reference in their entirety.

FIELD

The invention relates to the generating of billing data in a mobile communications system employing a Wireless Application Protocol (WAP).

BACKGROUND

The WAP is a protocol definition which allows subscriber terminals of a mobile communications system to use services implemented on the Internet or in a corporate intranet. Further information about WAP is available in the home pages of the WAP Forum, which defines the WAP specifications, at http://www.wapforum.org.

In WAP the Hypertext Markup Language HTML typically used in WWWW services (World Wide Web) to describe the contents structure and outer appearance of hypertext is replaced by WML (Wireless Markup Language).

WAP services do not employ similar search keys, such as "share" (of the stock market), as those to which users are accustomed in the value added short message services of the GSM (Global System for Mobile Communications) environment. The network part of a mobile communications system employing the WAP typically comprises a WAP Gateway which is used to identify a service request coming from a subscriber terminal and to transfer the request to the Contents Server that provides the service requested. The WAP Gateway then transmits the response data generated by the contents server on the basis of the service request to the subscriber terminal.

Since WAP services are not based on a unique search key, but a service is requested using its Internet address (Uniform Resource Locator, URL), the generating of billing data for the service is problematic. In principle, billing may be based on three different elements, depending on how the system is implemented.

If the bi-directional data transmission connection between the subscriber terminal and the mobile communications system is implemented using circuit-switched data transfer, such as a data call, then it is natural to apply connection time charging in the billing. However, a problem in this is that the billed amount is difficult to divide among the different services used. In addition, this does not allow an individual service to be charged for on the basis of its contents.

The data transmission can also be executed on a packet-switched connection, using the short message service or GPRS (General Packet Radio Service), for example, in which case billing can naturally be carried out on the basis of the number of packets transferred.

However, there are many services for which, due to their nature, transaction-based billing is the most reasonable both for the user of the service and its provider. Transaction in this context means a single service event. For example, if the service concerned is the current stock exchange quotation of a share, it is subject to a fixed, service transaction-based price not dependent on the connection time or the number of packets transferred.

In a mobile communications system which employs a wireless application protocol and packet-switched data transfer, for example, and in which a service is identified on the basis of its Internet address, transaction-based billing is difficult to implement because Internet addresses are complex in their structure and therefore the monitoring of traffic in the WAP gateway and in the associated billing system is problematic.

BRIEF DESCRIPTION

It is an object of the invention to provide an improved network part for a mobile communications system employing a wireless application protocol and an improved method for generating billing data in a mobile communications system employing a wireless application protocol.

According to an aspect of the invention there is provided a network part of a mobile communications system employing a wireless application protocol, comprising: means for setting up a bi-directional wireless data transmission connection to a subscriber terminal of the mobile communications system; means for transmitting a service request sent by the subscriber terminal to a contents server providing the service; means for transmitting response data generated in the contents server on the basis of the service request to the subscriber terminal; identifying means for identifying transactions associated with the service from among the service requests and the response data on the basis of the identification of the Internet address of the service referred to in the service request and the response data; and billing means for generating billing data for the service using the transactions identified on the basis of the service's Internet address.

According to an aspect of the invention there is provided a method for generating billing data in a mobile communications system employing a wireless application protocol, the method comprising: setting up a bi-directional wireless data transmission connection to a subscriber terminal of the mobile communications system; transmitting a service request sent by the subscriber terminal to a contents server providing the service; transmitting response data generated in the contents server on the basis of the service request to the subscriber terminal; identifying transactions associated with the service from among the service requests and the response data on the basis of the identification of the Internet address of the service referred to in the service request and the response data; and generating billing data for the service using the transactions identified on the basis of the service's Internet address.

The underlying idea of the invention is to create a general-purpose method for identifying a service by analysing its Internet address, the method thus allowing also events associated with a single transaction to be identified for the purpose of generating billing data.

The invention describes a general method for implementing transaction-based billing in a mobile communications system employing a wireless application protocol, the method reducing significantly the need for case-specific solutions. Since the solution is reproducible, it can be used in connection with a variety of services.

LIST OF DRAWINGS

In the following, the preferred embodiments of the invention will be described, by way of example, with reference to the accompanying drawings, in which.

DESCRIPTION OF EMBODIMENTS

Figure 1:
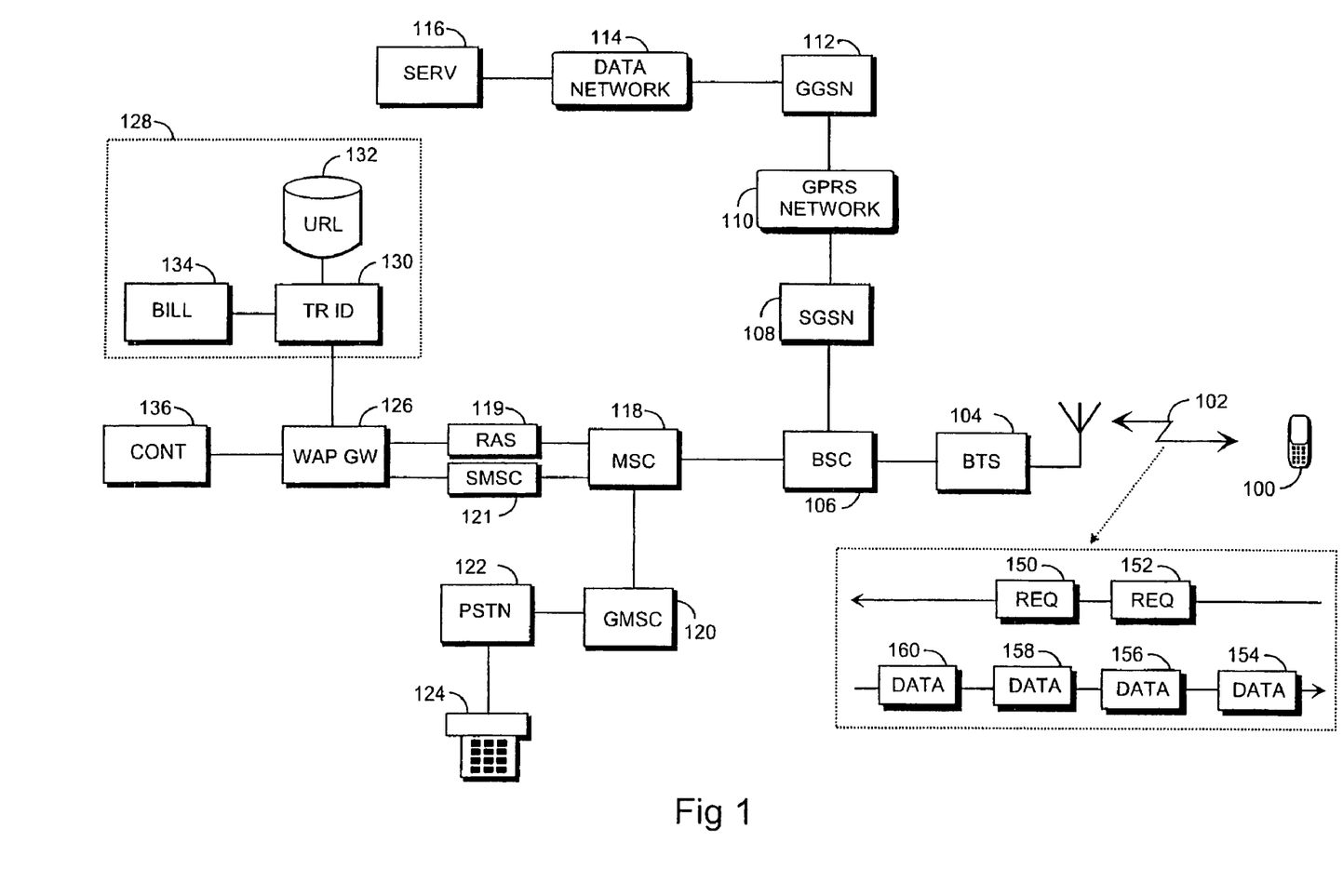
FIG. 1 is a schematic block diagram of a network part of a mobile communications system employing a wireless application protocol.

FIG. 1 is a schematic view of the structure of a network part of a mobile communications system. The mobile communications system may be for example a GSM system, GPRS system, or some other mobile system employing a wireless application protocol. FIG. 1 only shows the blocks that are essential for disclosing the invention, although it is apparent to a person skilled in the art that a conventional mobile communications system also comprises other functions and structures which need not be described in greater detail here. In this context, the mobile communications system network part refers to a fixed network infrastructure, such as base stations 104, base station controllers 106, mobile services switching centres 118, packet transfer systems 108, 110, 112, and other similar entities. Consequently, subscriber terminals 100 and systems, such as the global public switched telephone network 122, connected to the mobile communications system over predetermined interfaces are left outside the network part.

As shown in FIG. 1, a circuit-switched connection may be set up from the subscriber terminal 100 to a telephone 124, or other terminal, connected to the public switched telephone network 122. The subscriber terminal 100 may be for example a fixedly mounted, vehicle mounted or portable terminal.

The base station system, i.e. the radio network subsystem, comprises base stations 104 and base station controllers 106 controlling the base stations 104. In some environments the base station controller 106 may be referred to as a radio network controller, and the base stations 104 as nodes B.

A base station 104 comprises transceivers which are used for creating the actual radio links 103 to the subscriber terminals 100. A base station 104 may also comprise antenna units. In some environments, the antenna units may be used for implementing radio links that employ directional antenna beams.

The base station controller 106 comprises a switching field which is used for switching speech and data and for connecting signalling circuits. The base station system further comprises a transcoder. The transcoder 108 transforms different digital speech coding formats used between the public switched telephone network and the radio telephone network to make them mutually compatible, for example from the fixed network format of 64 kbit/s to a cellular radio network format (of 13 kbit/s, for example), and vice versa. The division of functions between the base station controller 106 and the base station 104 as well as their physical structure may vary depending on the implementation. The base station 104 is typically responsible for implementing the radio path as described above. The base station controller 104 typically carries out radio resources management, control of inter-cell handover, power adjustment, timing and synchronization, paging of a subscriber terminal.

The network part further comprises a mobile services switching centre 118 and a gateway mobile services switching centre 120 which is responsible for the external connections of the mobile communications system, in this case for those to the public switched telephone network 122.

The switching field of the base station controller 106 can be used for switching both to the public switched telephone network 122 and to the packet transfer network 110. The radio system also allows for packet-switched transmission based on the GPRS (General Packet Radio Service), for example. The GPRS is a service in which air interface transfer capacity free from circuit switching can be used for packet transfer.

Packet transfer is carried out over the Internet 114 from a computer 116 connected to the mobile communications system to the subscriber terminal 100.

The connection between the packet transfer network 110 and the switching field of the base station controller 106 is set up by a serving GPRS support node 108 SGSN. The support node 108 is responsible for transferring packets between the base station system and a gateway GPRS support node GGSN 112 and to keep record of the location of the subscriber terminal 100 within its area.

The gateway node 112 connects the public packet transfer network 114 to the packet transfer network 110. The interface may be provided using an Internet protocol or X.25 protocol. The packet transfer network 110 is typically a private network employing an Internet protocol and carrying signalling and user data. Below the Internet protocol layer, the structure of the network may vary by operator both in architecture and in protocols. The public packet transfer network 114 may be the world-wide Internet, for example.

FIG. 1 illustrates various possibilities for implementing a data transmission connection for a service employing the WAP. It is to be noted that the description is in no way binding, but illustrative, because the implementation of the WAP in the GPRS system is still under development and therefore the responsibilities and functions of the different parts have not been fixed yet. For this reason, instead of describing in greater detail a WAP service implemented using the GPRS, we shall describe a WAP service based on a circuit-switched data call or a short message service. The telecommunications connection used for implementing the WAP service may also be referred to as a Bearer Service. A bearer service may be implemented in any manner conforming to the WAP service specifications; in other words, in addition to the short message service and circuit-switched data call already mentioned, for example the CDMA technology (Code Division Multiple Access), the American D-AMPS system (Digital Advanced Mobile Phone Service, the CDPD (Cellular Digital Packet Data) service of the American AMPS system, or the Japanese PDC-P (Personal Digital Cellular Packet) system may be used.

As shown in FIG. 1, the data transmission connection 102 is set up from the subscriber terminal 100 to the base station 104 from which a connection is established through the base station controller 106 and the mobile services switching centre 118 to the WAP Gateway 126. To allow a circuit-switched data call to be connected, there is a RAS (Remote Access Server) 119 between the WAP Gateway 126 and the mobile services switching centre and, correspondingly, a short message centre 121 for connecting a short message service.

As already stated, the connection from the WAP Gateway 126 to a contents server 136 providing the service is established on the basis of the Internet address of the service, i.e. the WAP Gateway 126 implements means 126 to transmit a service request 150, 152 sent by the subscriber terminal 100 to the contents server 136 providing the service. Similarly, the WAP Gateway 126 implements means 126 to transmit to the subscriber terminal 100 response data 154, 156, 158, 160 generated in the contents server 136 on the basis of the service request 150, 152. The WAP Gateway is preferably implemented using equipment provided with a microprocessor, such as a computer comprising peripheral devices and the necessary system and application software. In other words, said means are preferably computer program modules executing a desired functionality. At the design and implementation of the system, the functions between the software and the hardware are divided for example according to the costs of manufacture costs and the data processing capacity and speed required. Tasks that require high speed can be carried out using ASICs (Application Specific Integrated Circuit).

Although FIG. 1 shows the service requests 150, 152 and the response data 154, 156, 158 160 in the form of packets, such as messages of the short message service, they can equally well be transferred on a circuit-switched connection, such as a data call. What is essential is that the traffic can be analysed to allow transactions associated with a specific service to be identified therein. In the example of FIG. 1 there are four response data packets 154, 156, 158 160 corresponding to the user's two service requests 150, 152, but any combinations are possible. In other words, there may be one or more service requests and, similarly, the response data may be divided into one or more parts. This is specifically what causes problems in identifying which traffic belongs to which service.

The WAP gateway 126 is connected to a billing system 128 which may be a separate system or a part of the WAP gateway 126, depending on the implementation.

The billing system 128 comprises identifying means 130, 132 for identifying transactions associated with the service referred to in the service requests 150, 152 and response data 154, 156, 158, 160 on the basis of the identified Internet address of the service referred to in the service request 150, 152 and the response data 154, 156, 158, 160, and billing means 134 for generating billing data for the service by using the transactions identified on the basis of the service's Internet address. The identifying means 130, 132 and the billing means 134 are implemented similarly as the WAP Gateway 126 in the above described alternatives: the implementation is based on a suitable hardware and software combination. In addition, the billing system 128 comprises either a specific invoice handling part 134 for editing the invoice for transmission to the customer, or an interface 134 to a separate invoice handling part outside the billing system.

Before discussing Internet address identification, we shall describe the structure of an Internet address. An Internet address (Uniform Resource Locator, URL) may also be referred to as a WWW address, web address or net address. It is a standard defined by the Network Working Group to describe addresses used on the Internet. In principle a text sequence forming an Internet address consists two parts: a schema and a schema-specific part, with a colon in between.

The schema defines the protocol to be used, for example:
http (Hypertext Transfer Protocol)
https (Secure Hypertext Transfer Protocol)
ftp (File Transfer Protocol)
news (Newsgroups)

The interpretation of the schema-specific part depends on the schema used. The schema-specific part typically defines the IP address (Internet Protocol). At the beginning of the schema-specific part, two slashes are used to show that the address conforms to the common Internet schema syntax.

There is no need to disclose the standard in its entirety in this context, but a simple example will be sufficient for understanding the idea. Let us take a look at the following Internet service address: http://www.sonera.fi/english/mobileportal/flash.html This address can be interpreted as follows:
"http" represents the schema used;
"//" indicates that the name in the address conforms to the Internet syntax;
P "www.sonera.fi" is in practice the name of the computer where the service resides. The name in question is a Domain Name which conceals the real name of the computer and which in the Internet protocol version 4 consists of a sequence of four numbers separated by a dot, each number comprising a maximum of three digits, for example 101.111.151.201. Each number is represented by eight bits, which means that its value can vary from 0 to 255. In the Internet protocol version 6, a sequence consists of six numbers. A specific network element, Domain Name Server (DNS), attaches the domain name to a specific address conforming to the Internet protocol;
"flash.html" is the name of the page (or service) that will be shown to the user, the character string "/english/mobileportal" preceding it defining the location of the page in the computer.

In a preferred embodiment the identifying means 130, 132 are formed of two parts, the actual identifying means 130 and a service identification table 132 associated with them. The table may be a software data structure, a file used by the software or, if the table is large, a database set up using some database software.

Figure 2:
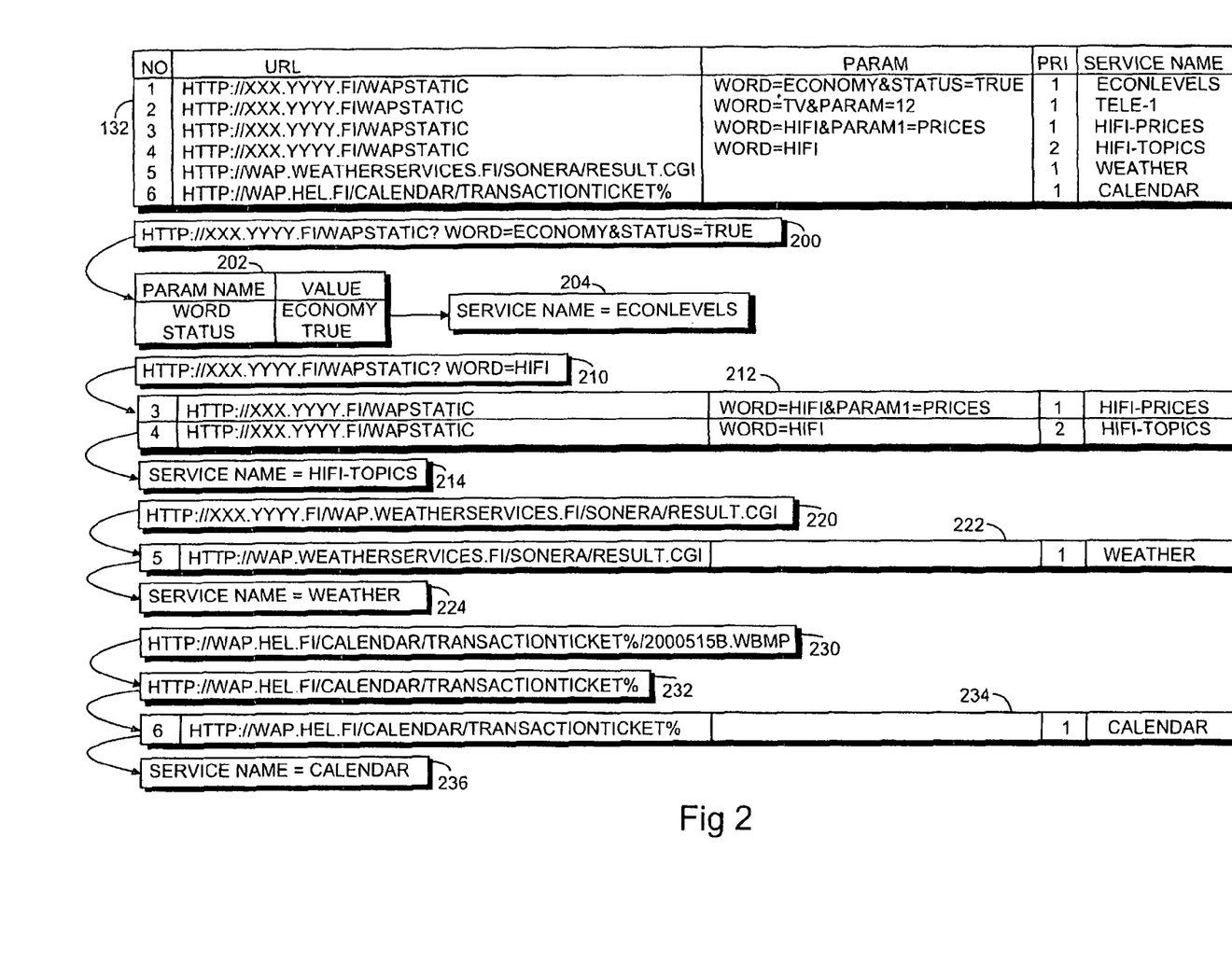
FIG. 2 illustrates the structure of a service identification table, together with examples of how Internet addresses are identified.

FIG. 2 illustrates an example of the structure of the service identification table. Each line in the service identification table 132 forms one data record. In the example the data records are numbered NO from one to five. Each data record is provided with the following: an Internet address URL of a service, for example "HTTP://XXX.YYY.FI/WAPSTATIC"; parameters PARAM associated with the service, such as "WORD=ECONOMY&STATUS=TRUE"; service priority PRI, such as "1"; and the name of the service SERVICE_NAME, for example "ECONLEVELS". In the mobile communications system of the operator concerned the name of the service is unique, in other words, instead of a complex Internet address having possibly a changing end part, the service can be referred to in billing using only the identified, unique name of the service.

There are various ways of identifying the Internet address URL of a service. The identifying means 130, 132 may carry out the identification on the basis of the parameters PARAM in the service's Internet address URL. For example, the service request comprises an address 200 which is "HTTP://XXX.YYY.FI/WAPSTATIC?WORD=ECONOMY&STATUS=TRUE".

In this case the identification means 130 pick the parameters from the service's Internet address 200 on the basis of the separator characters placed between the parameters. In our example a question mark and an ampersand are used as separator characters, i.e. the question mark is followed by service parameters "WORD=ECONOMY" and "STATUS=TRUE". The identifier means 130 distinguish the names and values of the parameters on the basis of separator characters placed between the parameter parts. In our example the separator is represented by the "=" sign, which means that the parameters can be shown in the form of table 202. In other words, there are two parameters in the example, the parameter name PARAM NAME of the first one being "WORD" and its value VALUE being "ECONOMY", and the parameter name PARAM NAME of the second one being "STATUS" and its value VALUE "TRUE".

A comparison of the service parameters with the data records in the service identification table 132 produces a unique service name 204 which is "ECONLEVELS". A person skilled in the art will apparently study various solutions for implementing the service identification table 132. Although in our example the stored parameters include the separator characters, other solutions are also possible; for example, each parameter could be stored as a separate data record part.

In a preferred embodiment the service priority PRI determines the order in which the services in the service identification table 132 are checked. The priorities PRI are preferably set such that the service having the most parameters in one and the same Internet address URL enjoys the highest priority PRI, and the service having the fewest parameters in one and the same Internet address URL has the lowest priority PRI. For example, if the Internet address 210 of the requested service is "HTTP://XXX.YYY.FI/WAPSTATIC?WORD=HIFI", two data records having the same domain name can be found in the service identification table 132, i.e. the data records shown in table 212. Data record number three which has the higher priority "1" is first compared with the Internet address 210. The comparison shows that it does not have a second parameter with a name "PARAM1" and value "PRICES". Next, a data record number 4 having a lower priority "2" is compared with the Internet address 210, whereby it is found that the only parameter in the request, i.e. parameter "WORD" having the value "HIFI" is in data record four. Consequently, the name 214 of the requested service is "HIFI-TOPICS". If the service priorities had been other way round, a wrong service might have been identified by mistake, depending of course on the comparison rules applied to the service identification table. The use of priorities allows similar Internet addresses to be used for services, reducing at the same time the number of parameters required.

If the service is not identifiable or the use of service parameters and possibly priorities is not feasible for identifying it, then the identifying means 130 identify the service on the basis of its Internet address URL. If the Internet address 220 of the service referred to in the service request is "HTTP://WAP.WEATHERSERVICES.FI/SONERA/RESULT.CGI", the service cannot be identified using parameters because the request contains none. In this case the routine goes through the service identification table 132 until record number five 222 is found on the basis of which the name 224 of the service is identified to be "WEATHER".

Sometimes several requests are received for one and the same service. However, all service requests are not necessarily subject to a charge. Service requests free of charge may be generated for example from different menu structures of a service and the related transition displays. In such cases the service identification table 132 preferably only comprises Internet addresses (URL) of services subject to a charge. For example, let us assume that the WAP Gateway receives the following service requests from a subscriber terminal:

http://xxx.yyy.fi:8080/CalendarTicket/2000515a.wbmp hftp://xxx.yyy.fi:8080/TransactionTicket%/2000515b.wbmp hftp://xxx.yyy.fi:8080/CalendarTicket/2000515c.wbmp.

The service involves the transfer of three files, 2000515a.wbmp, 2000515b.wbmp and 2000515c.wbmp, to the subscriber terminal. The files in question are image files forming a single calendar page on the subscriber terminal display. However, instead of billing each part of the service separately, the service is to be billed only once. The service identification table 132 is therefore configured to provide only one data record for the transactions to be billed, the data record being identified using for example a separately titled directory. The use of a separately titled directory allows the name of the file to be changed, if necessary, whereas the name of the directory remains unchanged. This facilitates the updating of the contents of the services. The described method allows transactions subject to a charge to be separated from those free of charge. Alternatively, transactions subject to a charge could be identified using a separate parameter indicating billing validity. However, when several transactions are involved, this would unnecessarily increase the amount of data to be transferred. For example, if the Internet address 230 of the requested service is "HTTP://WAP.HEL.FI/TRANSACTIONTICKET%/2000515B.WBMP", the Internet address 230 of the service concerned is first cut by leaving out the file name whereby the name 232 of the directory accommodating the service is obtained, the contents of the name being "HTTP:/WAP.HEL.FI/TRANSACTIONTICKET%". A comparison of the name 232 of the directory accommodating the service with the contents of the service identification table 132 produces a data record 234, i.e. record number six, in which the Internet service address URL is the same up to the truncation character. Consequently, the name 236 of the service requested is "CALENDAR". In the above example, the address is cut at a specific truncation character placed into the Internet address which in this case is the "%" sign used in the SQL (Structured Query Language) of Oracle® database. It is obvious to a person skilled in the art that there are also other ways to cut the address.

Figure 3:
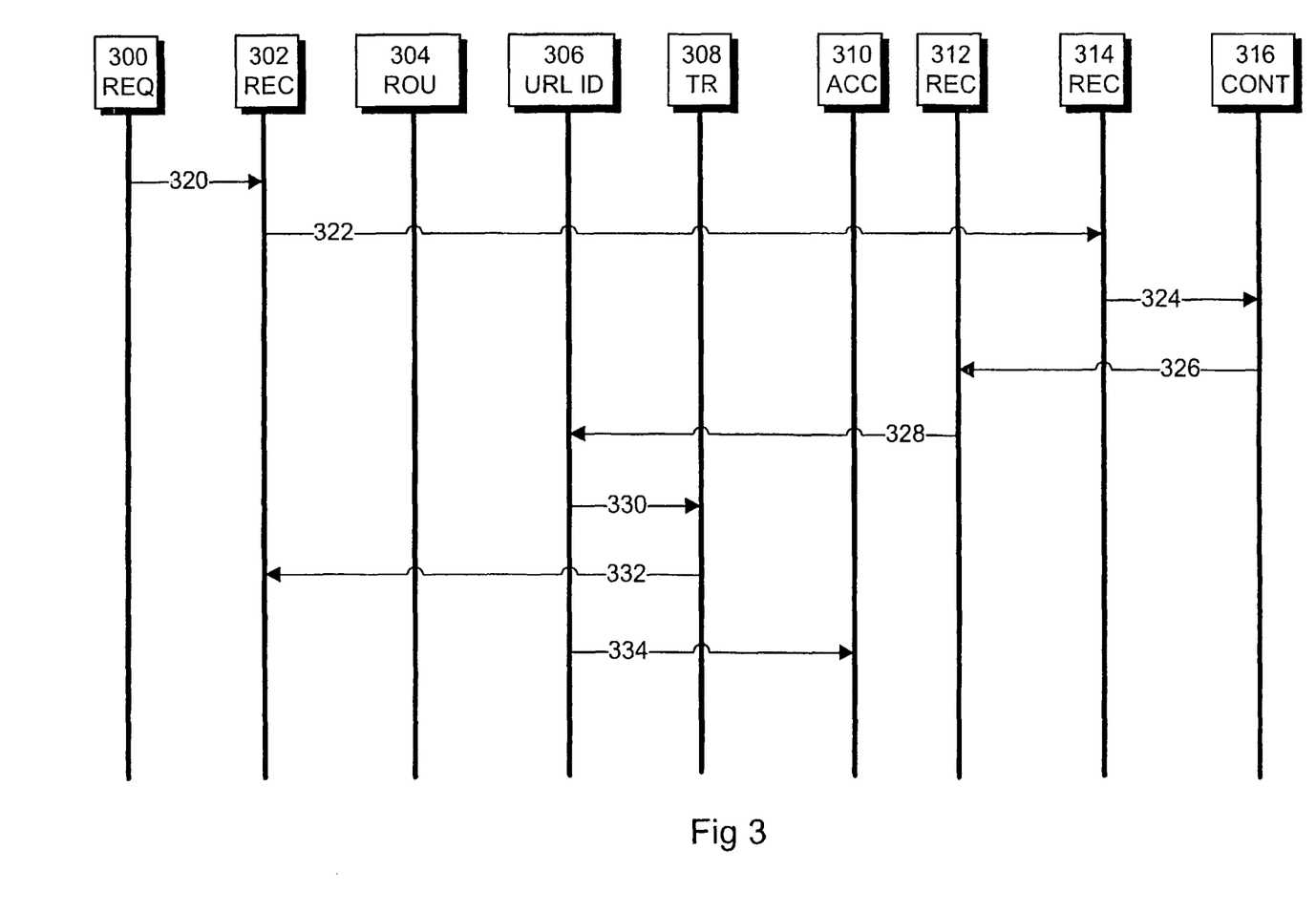
FIG. 3 is a signal sequence diagram illustrating messages transmitted in the mobile communications system employing the wireless application protocol.
Figure 4:
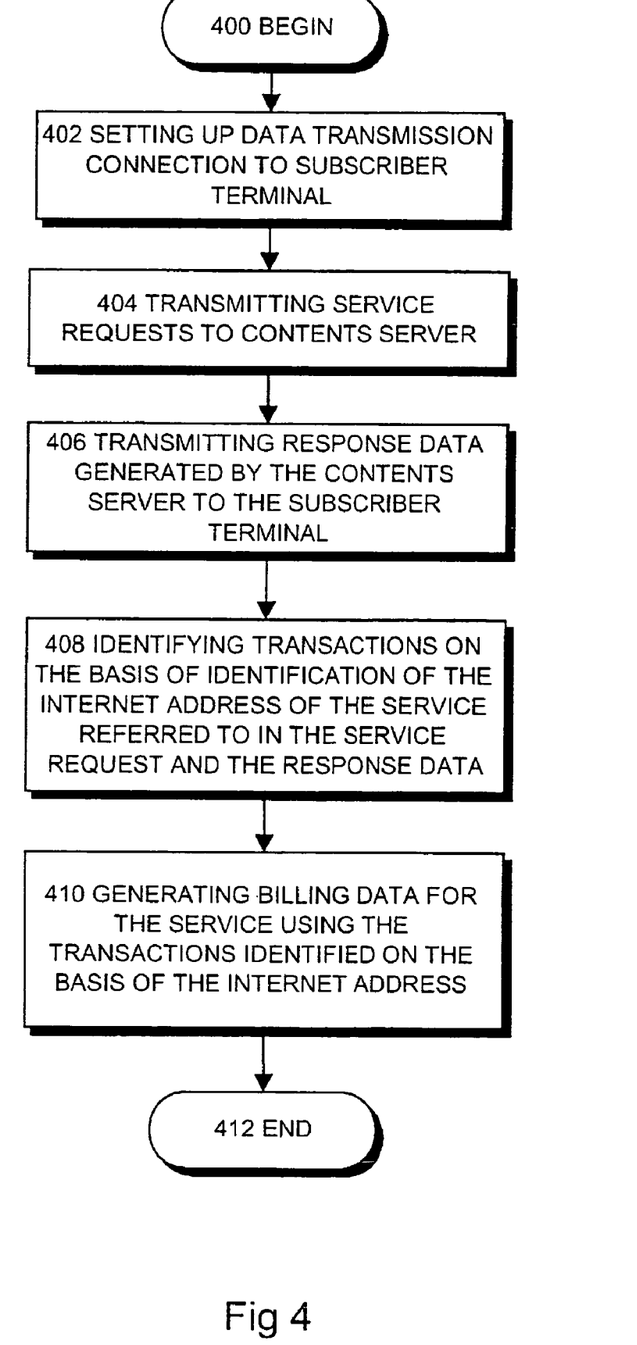
FIG. 4 is a flow diagram illustrating a method for generating billing data in the mobile communications system employing the wireless application protocol.

Finally, we shall refer to a flow chart shown in FIG. 4 to describe a method for generating billing data in the mobile communications system employing the wireless application protocol. Reference is also made to FIG. 3 which is a signal sequence diagram illustrating messages transferred in the mobile communications system employing the wireless application protocol.

The execution of the method starts at block 400. In block 402 a bi-directional wireless data transmission connection is set up to a subscriber terminal of the mobile communications system.

In block 404 a service request sent by the subscriber terminal is transmitted to a contents server providing the service. In other words, a request 300 is transmitted 320 to a network part 302 where it is received and routed 322 to the contents server 314. In the contents server 324 the request is transmitted 316 to the actual contents production means 316 which may be implemented in the same way as the actual WAP gateway, i.e. as a suitable combination of hardware and software.

Next, in block 406 response data generated in the contents server on the basis of the service request is transmitted to the subscriber terminal. In other words, the contents produced using the contents production means 316 in the signal sequence diagram is transmitted 326 to reception means 312, i.e. in practice often to the WAP Gateway, of the network part.

In block 408 transactions associated with the service concerned are identified from among the service requests and response data on the basis of the identification of the Internet address of the service referred to in the service request and the response data. Finally, the transactions identified on the basis of the service's Internet address are used in block 410 to generate the billing data of the service. In other words, the identifying means 306 are used in the signal sequence diagram 3 to identify the transactions after which the WAP gateway 308 is informed 330 that the response data for the service may be sent 332 to the subscriber terminal 302. When the transactions have been identified, they may be reported 334 to the billing system 310 for producing the bill. As will be shown in the appended claims, the method can be modified using the preferred embodiments described in connection with the network part.

Although the invention is described above with reference to an example according to the accompanying drawings, it is apparent that the invention is not restricted to it, but may vary in many ways within the inventive idea disclosed in the accompanying claims.

We claim:

1. A method adapted for use in a mobile communication system employing a wireless application protocol, the method comprising:
   receiving, at a gateway, a service request from a mobile subscriber for a service associated with a contents server, said service request associated with an Internet address Universal Resource Locator (URL);
   transmitting, from the gateway, said service request received from the mobile subscriber to said contents server associated with the service;
   receiving, at the gateway, associated response data generated by said contents server, at least in part, on the basis of said service request;
   analyzing at least a part of said Internet address URL to identify a billable transaction for said service, wherein said analyzing comprises determining if one or more service parameters can be identified within the Internet address URL;
      if one or more service parameters can be identified within the Internet address URL, attempting to determine a service name based on the one or more service parameters by comparing at least a portion of the one or more service parameters with one or more data records stored in a database in accordance with a service priority order that is set based on a number of service parameters associated with a particular data record;
      if the service name cannot be determined based on the one or more service parameters or if no service parameters are present within the Internet address URL, determining the service name based on the Internet address URL; and
   generating billing data based on the analyzing of at least part of said Internet address URL.

2. The method of claim 1, further comprising:
   forwarding said associated response data to said mobile subscriber.

3. The method of claim 1, wherein the service parameters are identified based on separator characters placed in between the service parameters.

4. The method of claim 1, wherein the one or more data records each include an Internet address URL.

5. The method of claim 1, further comprising directing one or more invoices from an invoice handling part of the gateway to an outside billing system or to the mobile subscriber.

6. The method of claim 1, wherein the one or more data records each include an Internet address URL, a service parameter, a service priority, and a service name.

7. A method adapted for use in a mobile communication system employing a wireless application protocol, the method comprising:
   receiving, at a billing node, a service request associated with an Internet address Universal Resource Locator (URL) and response data;
   analyzing, at the billing node, at least a part of said Internet address URL to identify a billable transaction, wherein said analyzing comprises determining if one or more service parameters can be identified within the Internet address URL;
      if one or more service parameters can be identified within the Internet address URL, attempting to determine a service name based on the one or more service parameters by comparing at least a portion of the one or more service parameters with one or more data records stored in a database in accordance with a service priority order that is set based on a number of service parameters associated with a particular data record;
      if the service name cannot be determined based on the one or more service parameters or if no service parameters are present within the Internet address URL, determining the service name based on the Internet address URL; and
   generating billing data based on the analyzing of at least part of said Internet address URL.

8. The method of claim 7, further comprising informing the gateway that the response data may be sent to the subscriber terminal.

9. The method of claim 7, wherein the service parameters are identified based on separator characters placed in between the service parameters.

10. The method of claim 7, wherein the one or more data records each include an Internet address URL.

11. The method of claim 7, further comprising directing one or more invoices to an outside billing system or to the mobile subscriber.

12. The method of claim 7, wherein the one or more data records each include an Internet address URL, a service parameter, a service priority, and a service name.

13. An apparatus adapted for use in a mobile communication system employing a wireless application protocol, the apparatus comprising:
   means for receiving a service request from a mobile subscriber for a service associated with a contents server, said service request associated with an Internet address Universal Resource Locator (URL);
   means for transmitting said service request received from the mobile subscriber to said contents server associated with the service;
   means for receiving associated response data generated by said contents server, at least in part, on the basis of said service request;
   means for analyzing at least a part of said Internet address URL to identify a billable transaction for said service, wherein the means for analyzing determines if one or more service parameters can be identified within the Internet address URL,
      wherein the means for analyzing attempts to determine a service name based on the one or more service parameters by comparing at least a portion of the one or more service parameters with one or more data records stored in a database in accordance with a service priority order that is set based on a number of service parameters associated with a particular data record if the means for analyzing identifies one or more service parameters within the Internet address URL, and wherein the means for analyzing determines a service name based on the Internet address URL if the service name cannot be determined based on the one or more service parameters or if no service parameters are present within the Internet address URL; and means for generating billing data based on the analyzing of at least part of said Internet address URL.

14. The apparatus of claim 13, further comprising:
means for forwarding said associated response data to said mobile subscriber.

15. The apparatus of claim 13, wherein the service parameters are identified based on separator characters placed in between the service parameters.

16. The apparatus of claim 13, wherein the one or more data records each include an Internet address URL.

17. The apparatus of claim 13, further comprising means for directing one or more invoices to an outside billing system or to the mobile subscriber.

18. The apparatus of claim 13, wherein the data records each include an Internet address URL, a service parameter, a service priority, and a service name.

19. An apparatus adapted for use in a mobile communication system employing a wireless application protocol, the apparatus comprising:

means for receiving a service request associated with an Internet address Universal Resource Locator (URL) and response data;

means for analyzing at least a part of said Internet address URL to identify a billable transaction, wherein the means for analyzing comprises means for determining if one or more service parameters can be identified within the Internet address URL, wherein the means for analyzing attempts to determine a service name based on the one or more service parameters by comparing at least a portion of the one or more service parameters with one or more data records stored in a database in accordance with a service priority order that is set based on a number of service parameters associated with a particular data record if the means for analyzing identifies one or more service parameters within the Internet address URL, and wherein the means for analyzing determines the service name based on the Internet address URL if the service name cannot be determined based on the one or more service parameters or if no service parameters are present within the Internet address URL; and means for generating billing data based on the analyzing of at least part of said Internet address URL.

20. The apparatus of claim 19, further comprising means for informing a gateway that the response data may be sent to the subscriber terminal.

21. The apparatus of claim 19, wherein the service parameters are identified based on separator characters placed in between the service parameters.

22. The apparatus of claim 19, wherein the one or more data records each include an Internet address URL.

23. The apparatus of claim 19, further comprising means for directing invoices to outside billing systems or to the mobile subscriber.

24. The apparatus of claim 19, wherein the data records each include an Internet address URL, a service parameter, a service priority, and a service name.

25. A gateway configured to:
receive a service request from a mobile subscriber for a service associated with a contents server, said service request associated with an Internet address Universal Resource Locator (URL);

transmit said service request received from a mobile subscriber to said contents server associated with the service;

receive associated response data generated by said contents server, at least in part, on the basis of said service request;

analyze at least a part of said Internet address URL to identify a billable transaction for said service by determining if one or more service parameters can be identified within the Internet address URL;

if one or more service parameters can be identified within the Internet address URL, the gateway is configured to attempt to determine a service name based on the one or more service parameters by comparing at least a portion of the one or more service parameters with one or more data records stored in a database in accordance with a service priority order that is set based on a number of service parameters associated with a particular data record;

if the service name cannot be determined based on the one or more service parameters or if no parameters are present with the Internet address URL, the gateway is configured to determine the service name based on the Internet address URL; and generate billing data based on the analysis of at least part of one of said Internet address URL.

26. A billing node configured to:
receive a service request associated with an Internet address Universal Resource Locator (URL) and response data;

determine if one or more service parameters can be identified within at least a part of the Internet address URL;

if one or more service parameters can be identified within the Internet address URL, attempt to determine a service name based on the one or more service parameters by comparing at least a portion of the one or more service parameters with one or more data records stored in a database in accordance with a service priority order that is set based on a number of service parameters associated with a particular data record;

if the service name cannot be determined based on the one or more service parameters or if no parameters are present with the Internet address URL, determine the service name based on the Internet address URL; and generate billing data based on the analysis of at least part of said Internet address URL.

* * * * *

UNITED STATES PATENT AND TRADEMARK OFFICE
CERTIFICATE OF CORRECTION

| | |
|---|---|
| PATENT NO. | : 7,885,637 B2 |
| APPLICATION NO. | : 11/511742 |
| DATED | : February 8, 2011 |
| INVENTOR(S) | : Marko Immonen et al. |

Page 1 of 1

It is certified that error appears in the above-identified patent and that said Letters Patent is hereby corrected as shown below:

ON THE FRONT OF PATENT:

Please correct the following:

Item (63) Related U.S. Application Data: Please add the following:

Continuation of application No. 10/243,366, filed on Sep. 12, 2002 <u>which is a continuation of application No. PCT/F101/00243 filed on Mar. 13, 2001</u>.

Item (30) Foreign Application Priority Data: Please delete the following:

"~~Mar. 13, 2001 (FI)............PCT/FI01/00213~~"

IN THE SPECIFICATION:

On page 1, column 1, lines 9 and 10, in the paragraph under the heading "CROSS-REFERENCE TO RELATED APPLICATIONS", please replace "~~the National Stage Application~~" with --<u>a continuation</u>--

Signed and Sealed this
Nineteenth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,885,637 B2 | Page 1 of 1 |
| APPLICATION NO. | : 11/511742 | |
| DATED | : February 8, 2011 | |
| INVENTOR(S) | : Immonen et al. | |

It is certified that error appears in the above-identified patent and that said Letters Patent is hereby corrected as shown below:

Title page, item (76), under "Inventors", in Column 1, Line 1, delete "Purjebtijantie" and insert -- Purjehtijantie --.

Signed and Sealed this
Tenth Day of May, 2011

David J. Kappos
*Director of the United States Patent and Trademark Office*